United States Patent
Smeal (10) Patent No.: US 11,368,364 B2
(45) Date of Patent: Jun. 21, 2022

(54) CONSOLIDATION OF EXISTING SIGNAL TRANSFER POINTS IN A TELECOMMUNICATION NETWORK

(71) Applicant: Level 3 Communications, LLC, Broomfield, CO (US)

(72) Inventor: Brad Smeal, Carnegie, PA (US)

(73) Assignee: Level 3 Communications, LLC, Broomfield, CO (US)

(*) Notice: Subject to any disclaimer, the term of this patent is extended or adjusted under 35 U.S.C. 154(b) by 68 days.

(21) Appl. No.: 16/775,038

(22) Filed: Jan. 28, 2020

(65) Prior Publication Data

US 2020/0267577 A1 Aug. 20, 2020

Related U.S. Application Data

(60) Provisional application No. 62/808,202, filed on Feb. 20, 2019.

(51) Int. Cl.
| | | |
|---|---|---|
| *H04L 41/0816* | (2022.01) | |
| *H04W 24/02* | (2009.01) | |
| *H04W 76/11* | (2018.01) | |
| *H04L 41/0826* | (2022.01) | |
| *H04L 41/082* | (2022.01) | |

(52) U.S. Cl.
CPC ........ *H04L 41/0816* (2013.01); *H04L 41/082* (2013.01); *H04L 41/0826* (2013.01); *H04W 24/02* (2013.01); *H04W 76/11* (2018.02)

(58) Field of Classification Search
CPC .................................................. H04L 41/0816
See application file for complete search history.

(56) References Cited

U.S. PATENT DOCUMENTS

| | | | |
|---|---|---|---|
| 2003/0031307 A1* | 2/2003 | Khadri | H04Q 3/0025 379/221.1 |
| 2004/0062377 A1* | 4/2004 | Daoud | H04Q 3/0025 379/229 |
| 2007/0109960 A1* | 5/2007 | Feng | H04L 29/06027 370/219 |
| 2008/0285737 A1* | 11/2008 | Agarwal | H04Q 3/0025 379/230 |

* cited by examiner

*Primary Examiner* — Jason E Mattis (57) ABSTRACT

The present disclosure is directed to consolidation of STP pairs without deploying new STP pairs and without making changes at a Service Switching Point to reflect the consolidation. In one aspect, a method includes identifying a first pair of signal transfer point devices to be decommissioned from a telecommunication network; identifying a second pair of signal transfer point devices to assume, in part, functionalities of the first pair of signal transfer point devices, each signal transfer point device of the first pair and the second pair having at least one primary point code and at least one secondary point code assigning a temporary secondary point code to each signal transfer point device of the first pair; and modifying at least one secondary point code of each signal transfer point device of the second pair with a primary point code of at least one signal transfer point device of the first pair.

14 Claims, 4 Drawing Sheets

CONSOLIDATION OF EXISTING SIGNAL TRANSFER POINTS IN A TELECOMMUNICATION NETWORK

RELATED APPLICATION DATA

This Application is related to and claims priority under 35 U.S.C. § 119(e) from U.S. Patent Application No. 62/808,202, filed on Feb. 20, 2019, the entire content of which is incorporated herein by reference.

TECHNICAL FIELD

The present disclosure generally relates to telecommunication networks and, in particular, to management and consolidation of existing signal transfer points within such telecommunication networks.

BACKGROUND OF THE INVENTION

A telecommunication network, among other conventional and/or developed components for operation thereof, may include multiple Signal Transfer Points (STPs). A Signal Transfer Point (STP) is a router that relays Signal System 7 (SS7) messages between Signaling End-Points (SEPs) and other STPs. Typical SEPs include Service Switching Points (SSPs) and Service Control Points (SCPs). An STP is typically connected to adjacent SEPs and STPs via signaling links or link sets. Based on the address fields of the SS7 messages, the STP routes the messages to the appropriate outgoing signaling link.

As network capacity demands increase and voice traffic migrates from Time Division Multiplexing (TDM) to Voice over IP (VoIP) based Signal Initiated Protocol (SIP), a common SS7 network project involves consolidation of STP Pairs in a network resulting in a reduced STP footprint. Such a consolidation may involve decommissioning of one or more pairs of STPs and rebuilding/replacing the same to be SIP compatible using at least one other existing pair of STPs to perform or assume its functionalities. STPs are typically used in pairs, for purposes of network redundancy and ensuring service continuity such that no single point of failure in a network would negatively impact communication sessions and data transfers within the network. However, current methods of consolidation and decommissioning of STP pairs are costly and time consuming.

SUMMARY OF THE INVENTION

One or more example embodiments of the present disclosure enable consolidation of STP pairs without the need for a new STP pair deployment and without making changes at a corresponding Service Switching Point (SSP) to reflect the switch from an old/existing STP pair to a new STP pair.

In one aspect, a method of managing networked devices includes identifying a first pair of signal transfer point devices to be decommissioned from a telecommunication network; identifying a second pair of signal transfer point devices to assume, in part, functionalities of the first pair of signal transfer point devices, each signal transfer point device of the first pair and the second pair having at least one primary point code and at least one secondary point code; assigning a temporary secondary point code to each signal transfer point device of the first pair; and modifying at least one secondary point code of each signal transfer point device of the second pair with a primary point code of at least one signal transfer point device of the first pair.

In another aspect, the method further includes removing the temporary second point code of each signal transfer point device of the first pair after modifying the at least one secondary point code of each signal transfer point device of the second pair with the primary point code of the at least one signal transfer point device of the first pair.

In another aspect, the temporary secondary point code is unique to a corresponding signal transfer point device of the first pair to which it is assigned.

In another aspect, the method further includes activating, on each signal transfer point device of the first pair and the second pair and prior to assigning the temporary secondary point code to each signal transfer point device of the first pair, a multiple point code feature.

In another aspect, each signal transfer point device of the first pair and the second pair are located in different geographical locations.

In another aspect, modifying the at least one secondary point code of each signal transfer point device of the second pair is a per link set process.

In another aspect, each link set connects one signal transfer point device of the first pair to a different signal transfer point device of the second pair.

In one aspect, a network controller is configured to manage networked devices. The network controller includes memory having computer-readable instructions stored therein; and one or more processors. The one or more processors are configured to execute the computer-readable instructions to identify a first pair of signal transfer point devices to be decommissioned from a telecommunication network; identify a second pair of signal transfer point devices to assume, in part, functionalities of the first pair of signal transfer point devices, each signal transfer point device of the first pair and the second pair having at least one primary point code and at least one secondary point code; assign a temporary secondary point code to each signal transfer point device of the first pair; and modify at least one secondary point code of each signal transfer point device of the second pair with a primary point code of at least one signal transfer point device of the first pair.

In one aspect, one or more non-transitory computer-readable media include computer-readable instructions, which when executed by one or more processors of a network controller, cause the network controller to identify a first pair of signal transfer point devices to be decommissioned from a telecommunication network; identify a second pair of signal transfer point devices to assume, in part, functionalities of the first pair of signal transfer point devices, each signal transfer point device of the first pair and the second pair having at least one primary point code and at least one secondary point code; assign a temporary secondary point code to each signal transfer point device of the first pair; and modify at least one secondary point code of each signal transfer point device of the second pair with a primary point code of at least one signal transfer point device of the first pair.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. The drawings depict only typical embodiments of the present disclosure and, therefore, are not to be considered limiting in scope.

DETAILED DESCRIPTION

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As noted above, one or more example embodiments of the present disclosure enable consolidation of STP pairs without the need for a new STP pair deployment and without making changes at a corresponding Service Switching Point (SSP) to reflect the switch from an old/existing STP pair to a new STP pair. An STP or a pair of STPs may also be referred to as an STP device or a pair of STP devices, respectively.

A typical STP may be a physical location at which known and necessary equipment for enabling transmission and relay of signals in a communication network are installed. Such equipment can include, but are not limited to, TDM equipment, switches, routers, monitoring equipment, etc. Known methods for consolidations of STPS involve changes to many STPs and end office SSPs, or the installation of a new STP pair with the capability of supporting a secondary point code.

An STP can have multiple point codes, which is essentially an address by which an STP is identified within a telecommunication network. STPs can therefore have implemented thereon, a feature that may be referred to as Multiple Point Codes (MPCs). MPC allows an STP to be configured with one True Point Codes (TPCs) as well as multiple Secondary Point Codes (SPCs). Utilization of TPCs and SPCs allow for collapsing/consolidating (decommissioning) an STP pair into another existing STP pair within the network.

Figure 1:
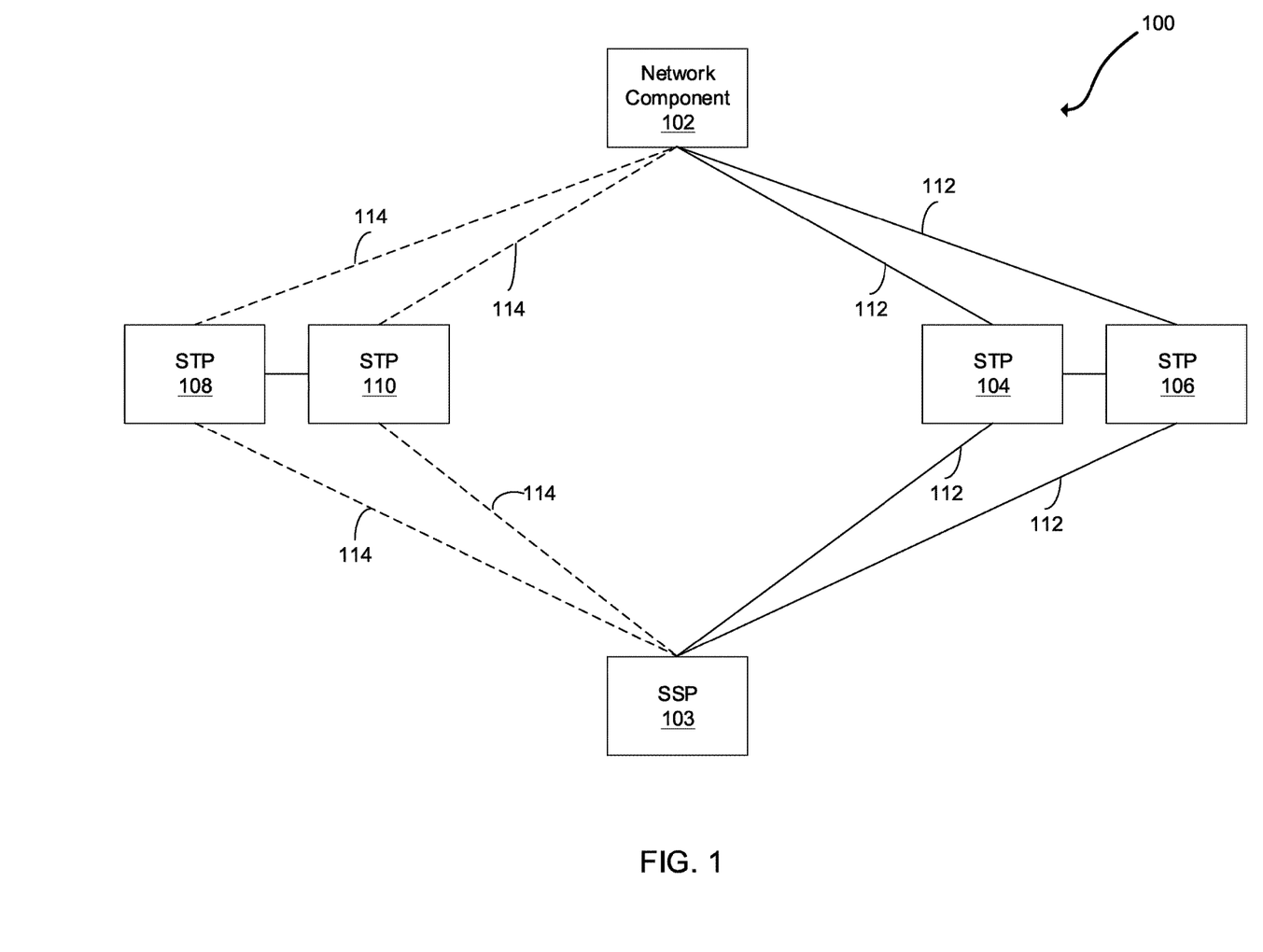
FIG. 1 illustrates consolidation of STP pairs according to one aspect of the present disclosure.

FIG. 1 illustrates consolidation of STP pairs in a telecommunications environment 100. In particular, the network environment 100 of FIG. 1 illustrates a portion of a telecommunications network that may include additional network components. In general, the environment 100 provides for establishing communication sessions between network users and for providing one or more network services to network users. For example, users may utilize the network 102 to communicate via the network using communication devices, such as telephone devices and/or mobile communication devices. In another example, the network environment 100 may facilitate communications between networks managed or administered by separate entities. In one specific example, the environment 100 includes an IP network, which may be provided by a wholesale network service provider. However, it should be appreciated that portions of the network may include non IP-based routing, such as devices utilizing time division multiplexing (TDM) or plain old telephone service (POTS) switching. In general, the network 100 of FIG. 1 may include any communication network devices known or hereafter developed.

The telecommunications network 100 includes numerous components such as, but not limited to gateways, routers, route reflectors, and registrars, which enable communication and/or provides services across the network, but are not shown or described in detail here because those skilled in the art will readily understand these components. In the partial depiction of a telecommunication network 100 shown in FIG. 1, network component 102 (which or any networking device) communicates with SSP 103 via STP 104 and STP 106. STP 104 and STP 106 form an STP pair of the network 100. In this example, a network administrator may intend to update the network 100 by replacing STP 104 and STP 106 (old STP pair) with STP 108 and STP 110 (New STP pair). In other words, STP 104 and STP 106 are to be decommissioned and the functionalities thereof transferred to the STP pair of STP 108 and STP 110. In FIG. 1, the communication link sets 112 between network component 102, STP 104, STP 106 and SSP 103 are shown using solid lines while link sets 114 between network component 100, STP 108, STP 110 and SSP 103 are shown using broken lines.

In this example, STP 104 has a TPC (e.g., 2-2-1) and STP 106 has a TPC (e.g., 2-2-2). To implement the replacement of the old STP pair with the new STP pair, TPC of STP 108 is set to TPC of STP 104 (i.e., 2-2-1) and TPC of STP 110 is set to TPC of STP 106. Using the same TPC requires that STP pair of 108 and 110 have no communication link sets to the STP pair of 104 and 106, which is not usually the case in a typical telecommunication network. Because of this, the method for consolidation of STP pairs generally includes a costly new STP pair deployment, or in the common case where communication link sets pre-exist between these pairs, the TPCs or SPCs must be different, requiring a manual reconfiguration at SSP 103 to implement the change to signal to a different set of TPCs, which within the context and scale of a large telecommunication network, constitutes unnecessary cost and introduces inefficiency in resource usage and management.

The above consolidation objective can be achieved without the need for a new STP pair deployment and without making changes at SSP 103 to reflect the switch from the old STP pair to the new STP pair.

Figure 2:
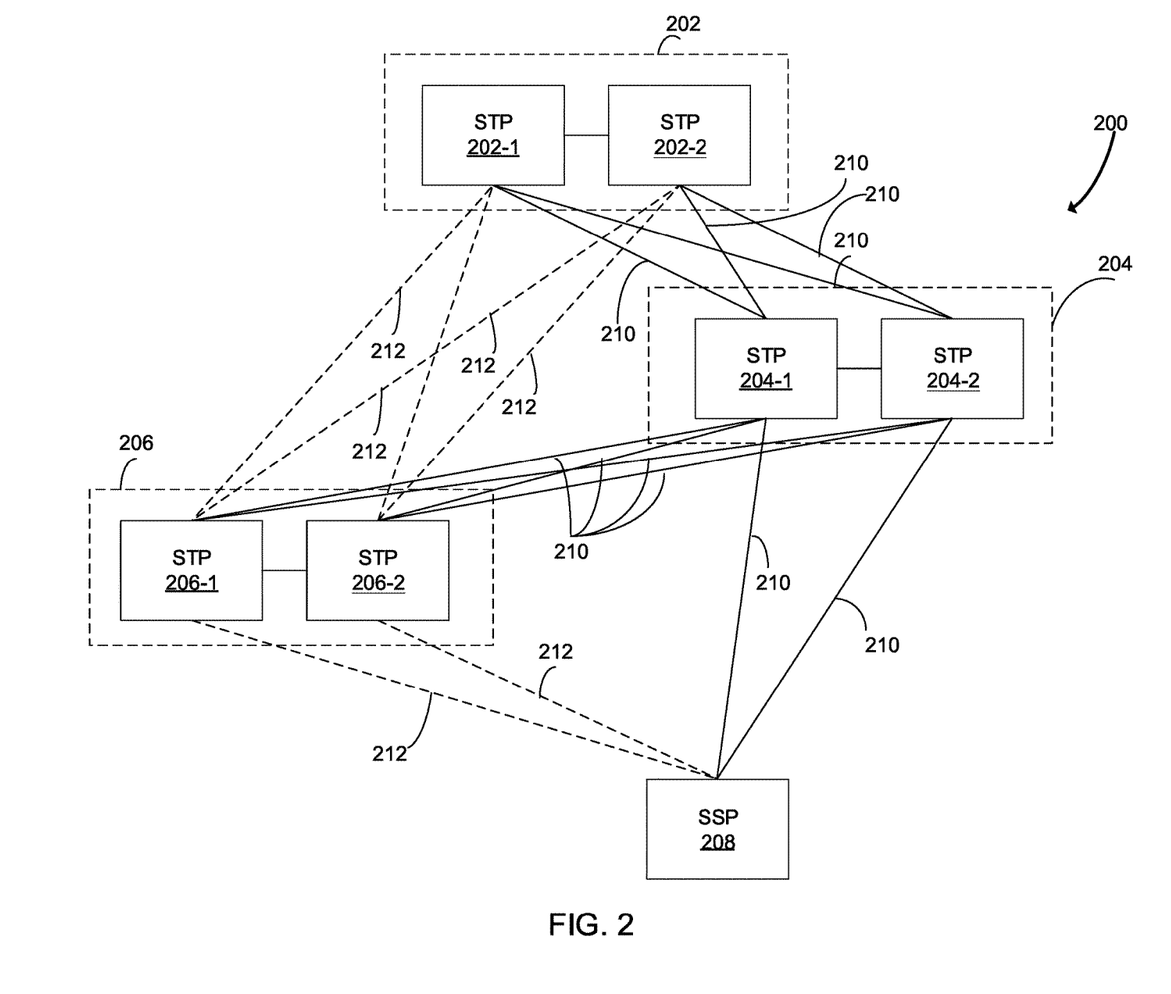
FIG. 2 illustrates example network architecture for implementing the consolidation process, according to one aspect of the present disclosure.

FIG. 2 illustrates example network architecture for implementing the consolidation process, according to one aspect of the present disclosure. As shown in FIG. 2, a partial depiction of a telecommunications network 200 includes three adjacent STP pairs, namely, STP pair 202, STP pair 204 and STP pair 206, which may be all connected, directly or indirectly, to SSP 208. In the particular and non-limiting example described herein with reference to FIGS. 2 and 3, STP pair 204 is to be decommissioned into STP pair 206. Therefore, STP pair 206 may also be referred to as the surviving STP pair 206.

Communication between STP pairs in FIG. 2 is shown using dash lines and solid lines. Solid lines 210 indicate current links between the devices and paths from STP pair 202, STP pair 204 and SSP 208. Communications from and to STP pair 204 are to be consolidated into (transferred to/diverted to) STP pair 206 after consolidation, and therefore are shown using dash lines 212.

In general, each of STP pairs 202, 204, and 206 include two STPs (hence the term STP pair). For example, STP pair 202 includes STPs 202-1 and 202-2, STP pair 204 includes STP 204-1 and 204-2, and STP pair 206 includes STP 206-1 and 206-2. In one example, each of the STPs shown in FIG. 2 (whether belonging to the same STP pair or not) may be physically located in different geographical regions (such as cities, states, countries, continents, etc.).

In the non-limiting example of FIG. 2, STP 202-1 has TPC 9-9-1 while STP 202-2 has TPC 9-9-2. Such TPCs such as 9-9-1 or 9-9-2 are in example formats and not limited to this exact representation. STPs 202-1 and 202-2 may each have more than one TPC as well as multiple SPCs. However, discussion of corresponding SPCs for STPs 202-1 and 202-2 are omitted as they are unnecessary for purposes of describing example embodiments of the present disclosure.

In the non-limiting example of FIG. 2, STP 204-1 and STP 204-2 have TPCs 1-1-1 and 1-1-2 as well as SPCs X-X-X and Y-Y-Y, respectively. These example TPCs and SPCs of STPs 204-1 and 204-2 will be further referenced in describing FIG. 3. Telecommunication network 200 can also include a network controller 116 for managing and controlling operations thereof. Controller 116 can be a single network component accessible by a network operator or may be virtual network component accessible via any type of known or to be developed end terminal such as a laptop, a desktop, a mobile device, etc. Communication between various components of network 200 can be based on any known or to be developed wired and/or wireless communication method.

In the non-limiting example of FIG. 2, STP 206-1 and STP 206-2 have TPCs 2-2-1 and 2-2-2 as well as SPCs 1-1-1 and 1-1-2, respectively. These example TPCs and SPCs of STPs 204-1 and 204-2 will be further referenced in describing FIG. 3.

As described above, each one of STPs shown in FIG. 2 can have a multiple point code feature that can be activated and the present disclosure relies on this feature for enabling the consolidation being described herein.

One example objective of the present disclosure is enabling decommissioning of STP pair 204 and consolidating STP pair 204 into existing STP pair 206 without the need for making provisioning changes at SSP 208 or SCP of telecommunication network 200 (not shown). Details of this objective will be described below with reference to FIG. 3.

While a specific example of decommissioning STP pair 204 and consolidating it into existing STP pair 206 is being described here, the present disclosure is not limited thereto and can be applied to decommissioning of any one or more pairs of STPs and consolidating the same into other existing STP pairs within a telecommunication network.

Figure 3:
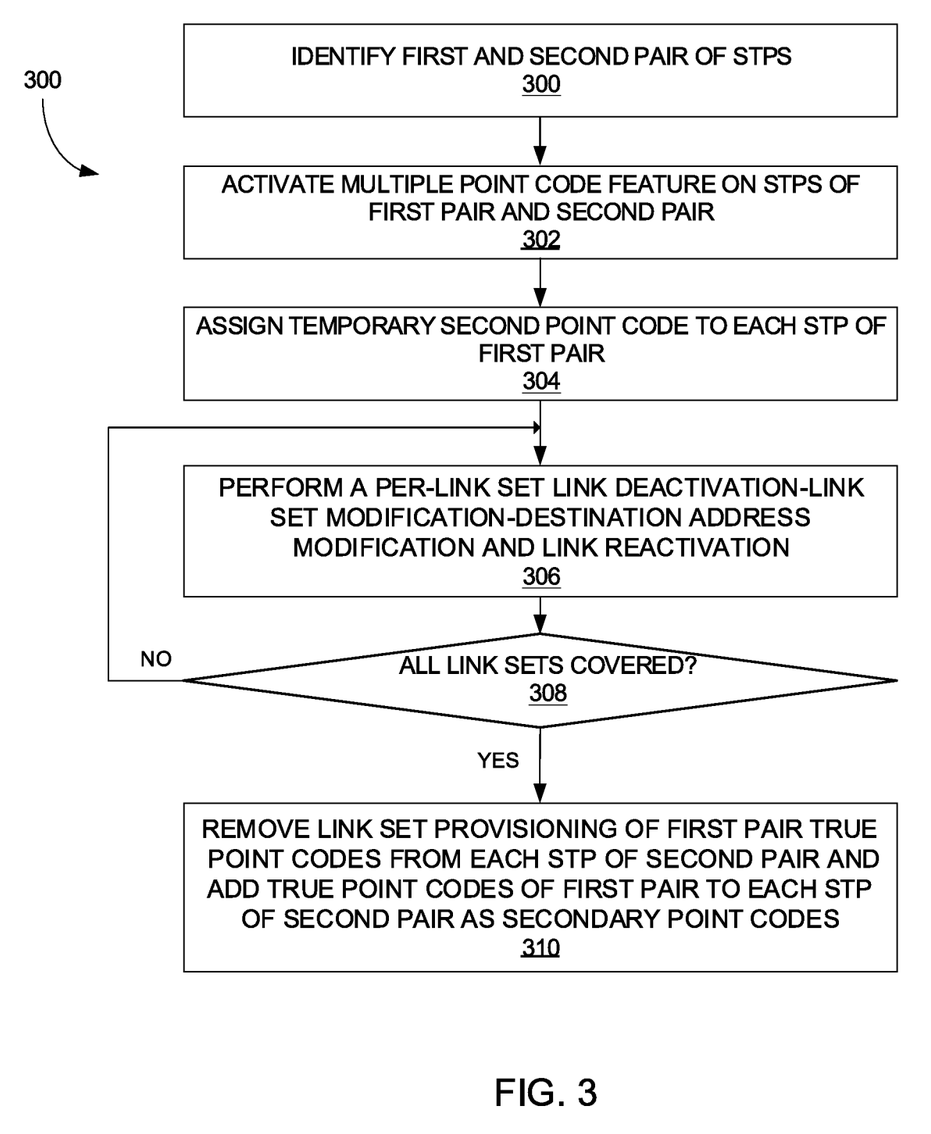
FIG. 3 describes an STP consolidation method, according to an aspect of the present disclosure.

FIG. 3 describes an STP consolidation method, according to an aspect of the present disclosure. FIG. 3 will be described from the perspective of network controller 116. However, it will be understood that network controller 116 can have one or more associated memories having computer-readable instructions, which can be executed by one or more associated processors to implement the functionalities of FIG. 3.

At operation S300, network controller 116 can identify first and second pair of STPs. A first pair of STPs can be the pair to be decommissioned and the second pair of STPs can be the pair to assume, in addition to already assigned functionalities, the functionalities of STPs of the first pair. Here and for purposes of describing examples of FIGS. 2 and 3, STP pair 204 is the first pair (to be decommissioned) and STP pair 206 is the second pair (to assume, in part, functionalities of STPs 204-1 and 204-2 of STP pair 204). This identification can be for example, based on an input received from a network operator communication, using any known method, with network controller 116.

At operation S302, network controller 116 can activate the multiple point code or MPC feature on STP pair(s) to be decommissioned as well as surviving STP pairs (on each STP of first pair and second pair identified at operation S300). In this non-limiting example, at operation S300, network controller 116 can activate MPC feature on STP 204-1, STP 204-2, STP 206-1 and STP 206-2.

At operation S304, network controller 116 assigns a unique and temporary secondary point code (SPC) to each STP of the first pair to be decommissioned, which in this non-limiting example, are STPs 204-1 and 204-2. An example temporary and unique SPC assigned to STP 204-1 is X-X-X and an example temporary and unique SPC assigned to STP 204-2 is Y-Y-Y, as described above with reference to FIG. 2.

Operation S306 is to be performed per link set basis. As noted above, a link set is a connection between any one of STPs to be decommissioned and any one of surviving STPs. As shown in FIG. 2, there are 4 link sets between STPs 204-1, 204-2, 206-1 and 206-2 (4 solid lines 210 between STPs 204-1, 204-2 and STPs 206-1 and 206-2).

At operation S306 and one link set at a time (per link set basis) in the appropriate surviving STP, network controller 116 performs a link deactivation for each link in a link set, link set modification to change to use the temporary and unique SPC, and link reactivation for each link in a link set. For example, in STP 206-1 network controller 116 deactivates links in link set 210 between STP 206-1 and STP

204-1, modifies this same link set to use the SPC of STP 204-1 (i.e., X-X-X) and then reactivates the links in link set 210 between STP 206-1 and STP 204-1. In STP 204-1, network controller 116 changes the destination address for 206-1 such that link set 210 between STP 204-1 and 206-1 uses the SPC of STP 204-1 (i.e., X-X-X) as the originating address assignment in messages across this link set. At the next iteration, in STP 206-1 network controller 116 deactivates links in link set 210 between STP 206-1 and STP 204-2, modifies this same link set to use the SPC of STP 204-2 (i.e., Y-Y-Y) and then reactivates the links in link set 210 between STP 206-1 and STP 204-2. In STP 204-2, network controller 116 changes the destination address for 206-1 such that link set 210 between 204-2 and 206-1 uses the SPC of STP 204-2 (i.e., Y-Y-Y) as the originating address assignment in messages across this link set. At the next iteration, in STP 206-2 network controller 116 deactivates links in link set 210 between STP 206-2 and STP 204-1, modifies this same link set to use the SPC of STP 204-1 (i.e., X-X-X) and then reactivates the links in link set 210 between STP 206-2 and STP 204-1. In STP 204-1, network controller 116 changes the destination address for 206-2 such that link set 210 between 204-1 and 206-2 uses the SPC of STP 204-1 (i.e., X-X-X) as the originating address assignment in messages across this link set. At the next iteration, in STP 206-2 network controller 116 deactivates links in link set 210 between STP 206-2 and STP 204-2, modifies this same link set to use the SPC of STP 204-2 (i.e., Y-Y-Y) and then reactivates the links in link set 210 between STP 206-2 and STP 204-2. In STP 204-2, network controller 116 changes the destination address for 206-2 such that link set 210 between 204-2 and 206-2 uses the SPC of STP 204-2 (i.e., Y-Y-Y) as the originating address assignment in messages across this link set.

At operation S308, network controller 116 determines if all link sets have been covered. If not, the process reverts back to S306 and network controller 116 repeats S306 as described above. Once all link sets are covered, then at operation S310, network controller 116 modifies surviving STPs, STP 206-1 and STP 206-2, to remove old link set provisioning associated with the TPCs of 204-1 (i.e., 1-1-1) and TPC of 204-2 (i.e., 1-1-2). Once removed, network controller 116 modifies surviving STPs, STP 206-1 and 206-2, to add the TPC of 204-1 (i.e., 1-1-1) as a SPC of 206-1, and add the TPC of 204-2 (i.e., 1-1-2) as a SPC of 206-2. Thereafter, the method ends.

Upon completion of the method of FIG. 3, subsequent network facility migrations away from STP pair 204 may be performed as deemed fit by operators of telecommunication network 200. For example, physical locations of STPs 204-1 and 204-2 may be visited and equipment installed therein, which have been decommissioned, may be disassembled and taken for further use, reuse, etc. As part of the decommissioning of STPs 204-1 and 204-2, provisioning associated with link set 210 and the temporary SPCs will be removed from STP pair 206.

By implementing the above example embodiments, the following advantages may be achieved. First, capital and operational expenses associated with a new STP Pair deployment may be avoided. Second, SSP and SCP provisioning changes requirement are eliminated. Third, STP provisioning changes are minimized. Fourth, flexibility of a simplified phased consolidation is provided.

The disclosure now turns to description of example systems that can be used as any one of network controller 116, any one of STPs shown in FIGS. 2 and 3 and described above, SSP 208, etc.

Figure 4:
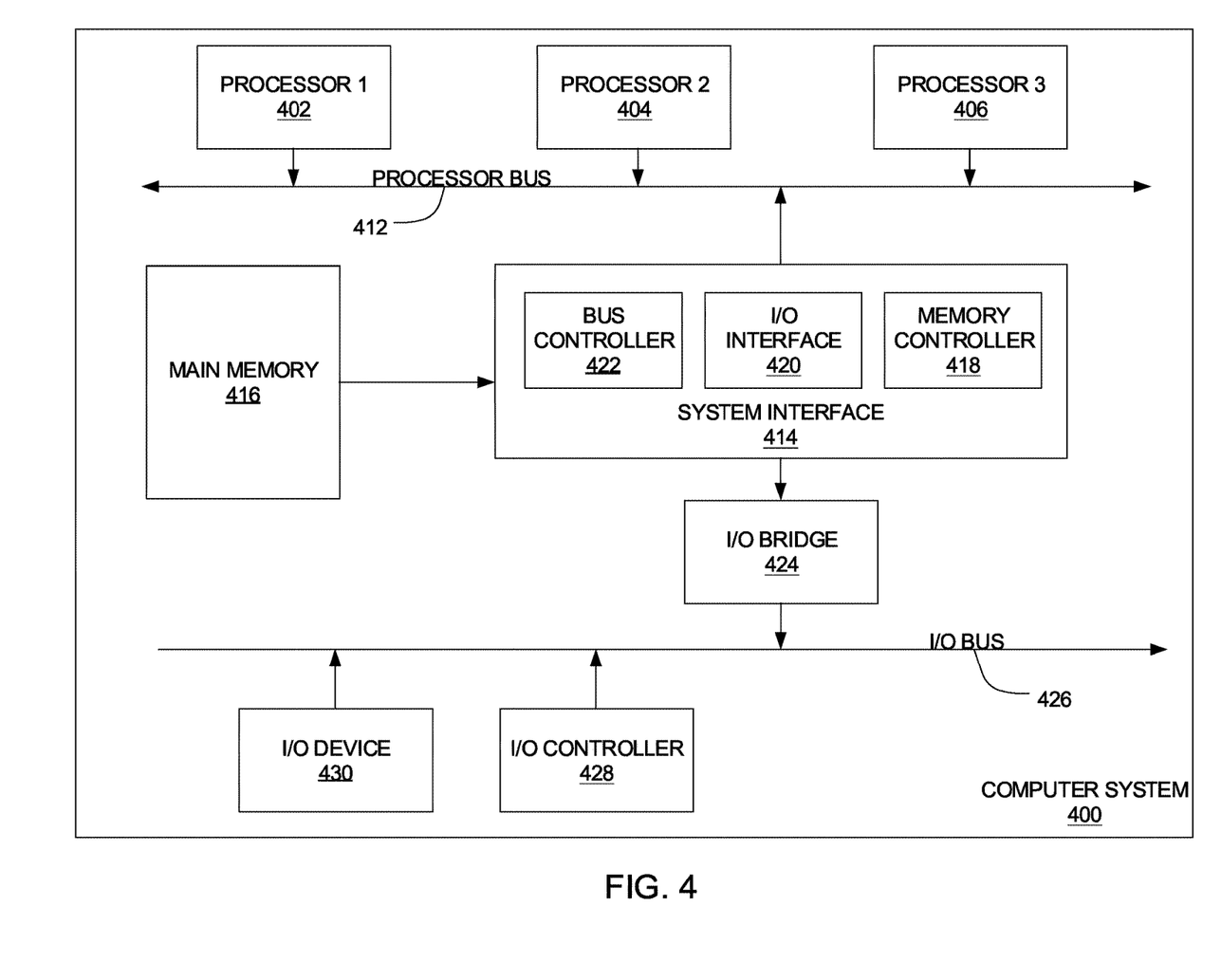
FIG. 4 is a diagram illustrating an example of a computing system which may be used in implementing examples of the present disclosure, according to one aspect of the present disclosure.

FIG. 4 is a diagram illustrating an example of a computing system which may be used in implementing examples of the present disclosure, according to one aspect of the present disclosure. is an example of FIG. 4 is a block diagram illustrating an example of a computing device or computer system 400 which may be used in implementing the embodiments of the network disclosed above. In particular, the computing device of FIG. 4 is one embodiment of the server or other networking component that performs one of more of the operations described above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method of managing networked devices, the method comprising:
    identifying a first pair of signal transfer point devices to be decommissioned from a telecommunication network;
    identifying a second pair of signal transfer point devices to assume, in part, functionalities of the first pair of signal transfer point devices, each signal transfer point device of the first pair and the second pair having at least one primary point code and at least one secondary point code;
    assigning a temporary secondary point code to each signal transfer point device of the first pair;
    activating, on each signal transfer point device of the first pair and the second pair and prior to assigning the temporary secondary point code to each signal transfer point device of the first pair, a multiple point code feature;
    modifying at least one secondary point code of each signal transfer point device of the second pair with a primary point code of at least one signal transfer point device of the first pair; and
    removing the temporary second point code of each signal transfer point device of the first pair after modifying the at least one secondary point code of each signal transfer point device of the second pair with the primary point code of the at least one signal transfer point device of the first pair.

2. The method of claim 1, wherein the temporary secondary point code is unique to a corresponding signal transfer point device of the first pair to which it is assigned.

3. The method of claim 1, wherein each signal transfer point device of the first pair and the second pair are located in different geographical locations.

4. The method of claim 1, wherein the modifying the at least one secondary point code of each signal transfer point device of the second pair is a per link set process.

5. The method of claim 4, wherein each link set connects one signal transfer point device of the first pair to a different signal transfer point device of the second pair.

6. A network controller configured to manage networked devices, the network controller comprising:
    memory having computer-readable instructions stored therein; and
    one or more processors configured to execute the computer-readable instructions to:
    identify a first pair of signal transfer point devices to be decommissioned from a telecommunication network;
    identify a second pair of signal transfer point devices to assume, in part, functionalities of the first pair of signal transfer point devices, each signal transfer point device of the first pair and the second pair having at least one primary point code and at least one secondary point code;
    assign a temporary secondary point code to each signal transfer point device of the first pair;
    activate, on each signal transfer point device of the first pair and the second pair and prior to assigning the temporary secondary point code to each signal transfer point device of the first pair, a multiple point code feature;
    modify at least one secondary point code of each signal transfer point device of the second pair with a primary point code of at least one signal transfer point device of the first pair; and
    remove the temporary second point code of each signal transfer point device of the first pair after modifying the at least one secondary point code of each signal transfer point device of the second pair with the primary point code of the at least one signal transfer point device of the first pair.

7. The network controller of claim 6, wherein the temporary secondary point code is unique to a corresponding signal transfer point device of the first pair to which it is assigned.

8. The network controller of claim 6, wherein each signal transfer point device of the first pair and the second pair are located in different geographical locations.

9. The network controller of claim 6, wherein modifying the at least one secondary point code of each signal transfer point device of the second pair is a per link set process.

10. The network controller of claim 9, wherein each link set connects one signal transfer point device of the first pair to a different signal transfer point device of the second pair.

11. One or more non-transitory computer-readable media comprising computer-readable instructions, which when executed by one or more processors of a network controller, cause the network controller to:
    identify a first pair of signal transfer point devices to be decommissioned from a telecommunication network;
    identify a second pair of signal transfer point devices to assume, in part, functionalities of the first pair of signal transfer point devices, each signal transfer point device of the first pair and the second pair having at least one primary point code and at least one secondary point code;
    assign a temporary secondary point code to each signal transfer point device of the first pair;
    activate, on each signal transfer point device of the first pair and the second pair and prior to assigning the temporary secondary point code to each signal transfer point device of the first pair, a multiple point code feature;

modify at least one secondary point code of each signal transfer point device of the second pair with a primary point code of at least one signal transfer point device of the first pair; and remove the temporary second point code of each signal transfer point device of the first pair after modifying the at least one secondary point code of each signal transfer point device of the second pair with the primary point code of the at least one signal transfer point device of the first pair.

12. The one or more non-transitory computer-readable media of claim 11, wherein the temporary secondary point code is unique to a corresponding signal transfer point device of the first pair to which it is assigned.

13. The one or more non-transitory computer-readable media of claim 11, wherein modifying the at least one secondary point code of each signal transfer point device of the second pair is a per link set process.

14. The one or more non-transitory computer-readable media of claim 13, wherein each link set connects one signal transfer point device of the first pair to a different signal transfer point device of the second pair.

* * * * *